May 8, 1928.
B. B. BEACH
STEAM TRAP
Filed March 15, 1927
1,668,667
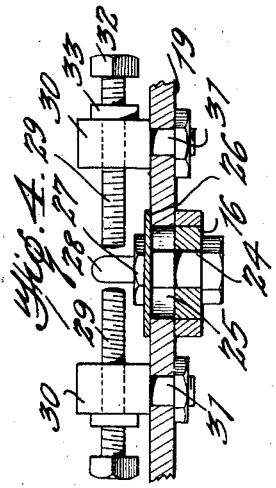
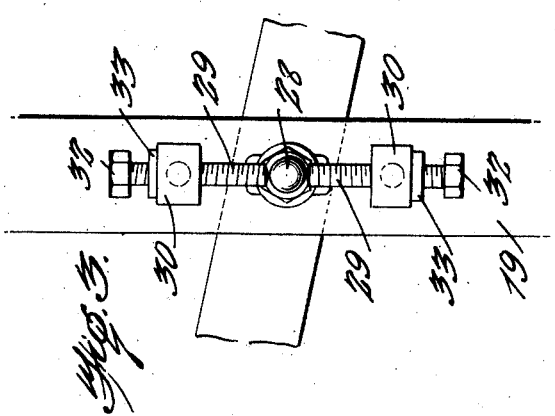
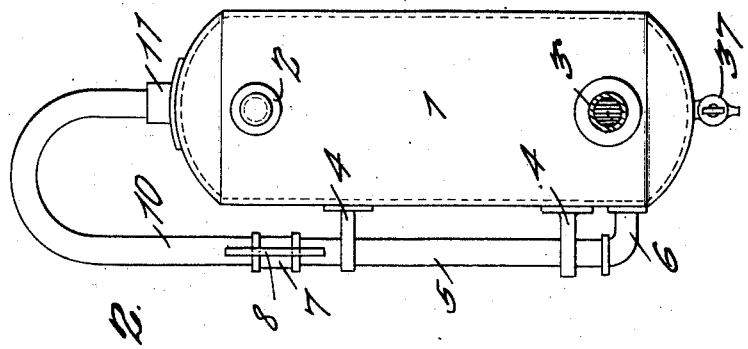
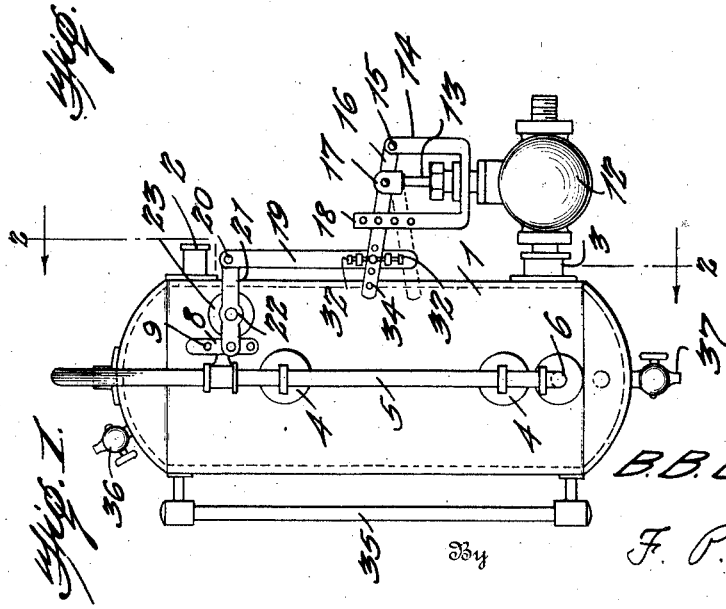
Inventor
B. B. BEACH,
By F. P. Lorin
Attorney Patented May 8, 1928.

1,668,667

UNITED STATES PATENT OFFICE.

BRADFORD B. BEACH, OF SEATTLE, WASHINGTON.

STEAM TRAP.

Application filed March 15, 1927. Serial No. 175,561.

This invention relates to an improvement in steam traps wherein provision is made to permit the condensed steam or water to escape while at the same time the trap remains sealed against the escape of live steam.

A primary object of the present invention is the provision of means whereby the water controlling valve may be cut off in the event of undue accumulation of steam in the trap, to thereby prevent the escape of steam.

A further object is the provision of means whereby the control may be adjusted at will to render the outlet valve more sensitive to steam accumulation.

The invention is illustrated in the accompanying drawings in which:

Figure 1 is a view in front elevation of the improved trap.

Figure 2 is a sectional view taken on line 2—2 of Figure 1.

Figure 3 is an enlarged elevation of the means for adjusting the valve lever.

Figure 4 is a view in side elevation, partly in section, of the same.

With particular reference to the accompanying drawings, 1 indicates an appropriate tank having an inlet 2 and outlet 3. Mounted in guides 4 secured to the tank is a pipe section 5 which at the lower end is connected through an elbow section 6 with the tank 1. Above the upper guide 4, the pipe 5 is provided with a T connector 7, one member of this T being in the form of a plate 8 having a series of apertures 9. A return bend pipe 10 connects with the T 7 and with a boss 11 on the upper end of the tank, so that the pipe described is in open communication with the respective ends of the tank and is permitted longitudinal movement by means of the guides 4.

Secured to the outlet from the trap is a conventional balance valve 12 having a valve operating stem 13, this balance valve being one of the usual types on the open market and requiring no specific description. The valve 12 is provided with a guide frame 14 to one arm of which is pivoted at 15 an operating lever 16, which lever is connected at 17 to the valve stem 13 and projects through the other member of the guide frame which, if desired, may be formed with openings 18 to receive pins to limit the movement of the lever 16.

The free end of the lever 16 is connected, through a specific means to be later described, to a link 19, the upper end of which is connected at 20 to a lever 21 pivotally supported at 22 upon a boss 23 projecting from the tank, the opposite end of the lever being adapted for connection to the plate 8 through one of the holes 9.

The connection between the lever 16 and link 19 is designed to be conveniently adjustable in order that the set of the valve may be controlled as desired. This adjusting means is illustrated more particularly in Figures 3 and 4 wherein the lever 16 is formed with a series of openings 34 to receive a bolt 24 which is adapted to pass through a slot 25 in the link 19. A washer or plate 26 encircles the bolt, overlying and bridging the slot and a nut 27 cooperates with the bolt to hold the parts in cooperating relation. The bolt extends above the nut, as at 28, and rests between the proximate ends of adjusting bolts 29 threadedly mounted in blocks 30 secured through the medium of threaded reduced extensions 31 in the link 19. The bolts 29 are adjusted by means of their heads 32 and locked in adjusted position by lock nuts 33. Obviously, the lever 16 may be adjusted relative to the link by the bolts 29 to the extent permitted by the slot 25, while other adjustments of the connection are permitted through the holes 9 and through the several openings 34 formed in the lever 16 to receive the bolt 24.

The tank 1 is provided with a gauge 35 in open communication with the interior of the tank for indicating the water level therein, and is further provided with upper and lower pet cocks 36 and 37.

In the operation of the steam trap, the valve 12 is normally opened to the extent to maintain a predetermined water level in the trap, as is well understood. The incoming condensed steam or water through the inlet 2 will, of course, maintain the level in the tank 1 as predetermined, the excess water being permitted to escape to the boiler. If the inlet admits live steam to a greater extent than anticipated or provided for, the steam accumulates between the top of the water and the tank, thereby heating the tubes 5 and 10 and causing expansion thereof. This actuates the plate 8, the lever 21, the link 19 and the lever 16, closing the valve 12. No steam is, therefore, permitted to escape from the tank as steam. The presence of excessive steam in the trap maintains the valve 12 closed until the steam condenses, permitting the pipe to cool and to return to normal position which, of course, restores the valve to a normal opening to continue the operation of the trap.

If air accumulates in the trap, it may be allowed to escape through the pet cock 36, and if this pet cock is left partially open, the trap will be kept free of air. A negligible proportion of steam will escape from the trap with the air. The level of water in the tank may be determined at all times by the gauge 35 while the pet cock 37 provides for drainage of the tank to remove sediment or other accumulation.

Through the use of the adjusting bolts 29, the effect of the movement of the link 19 on the lever 16 may be adjusted as closely as desired, the use of the bolt 24 in a particular hole 34 providing also for the variation of leverage on the lever 16 in the movement of the link 19.

What I claim to be new is:

A steam trap comprising a tank having an inlet, an outlet, a valve controlling the outlet, a lever for operating the valve, a pipe communicating with the interior of the tank at the lower end and opening into the tank at the upper end, said pipe being mounted for expansion and contraction, a pivoted lever operated by the pipe, a link connected to said last mentioned lever, and an adjustable connection between said link and the valve controlling lever, said connection comprising bolts mounted for adjustment longitudinally of the link and means carried by the valve controlling lever to be operated by said bolts.

In testimony whereof I affix my signature.

BRADFORD B. BEACH.